United States Patent [19]
Lump

[11] Patent Number: 5,331,743
[45] Date of Patent: Jul. 26, 1994

[54] TILE SAW APPARATUS

[76] Inventor: Charles A. Lump, 201 S. Main, DeGraff, Ohio 43318

[21] Appl. No.: 51,774

[22] Filed: Apr. 26, 1993

[51] Int. Cl.⁵ .................. B23D 45/16; B26D 7/08
[52] U.S. Cl. ........................... 30/388; 30/390; 83/169
[58] Field of Search ............... 30/166, 246, 388, 390, 30/292; 83/169, 171; 125/13.01, 11.22

[56] References Cited

U.S. PATENT DOCUMENTS

| | | | |
|---|---|---|---|
| 2,563,059 | 8/1951 | Oas | 83/169 |
| 4,008,720 | 2/1977 | Brinckmann et al. | 83/171 |
| 4,153,973 | 5/1979 | Hughes | 83/169 |
| 4,483,071 | 11/1984 | Kolste | 30/388 |
| 4,619,170 | 10/1986 | Maier et al. | 30/388 |
| 4,870,946 | 10/1989 | Long et al. | 83/169 |
| 4,887,599 | 12/1989 | Muller | 30/390 |

Primary Examiner—Richard K. Seidel
Assistant Examiner—Paul M. Heyrana, Sr.
Attorney, Agent, or Firm—E. Michael Combs

[57] ABSTRACT

A tile saw is arranged to include a drive motor and output shaft. The tile saw output shaft includes a fluid conduit in a further embodiment directing cooling fluid flow to the associated circular saw employing a drive fluid pump therefore. In a further embodiment, a modified circular sector hood is mounted about the saw directing fluid flow to the periphery of the circular saw in use.

1 Claim, 4 Drawing Sheets

TILE SAW APPARATUS

BACKGROUND OF THE INVENTION

1. Field of the Invention

The field of invention relates to saw apparatus, and more particularly pertains to a new and improved tile saw apparatus wherein the same is directed to the application of cooling fluid relative to a circular saw arrangement.

2. Description of the Prior Art

The prior art has heretofore employed a variety of tile cutting saw structure, such as indicated in U.S. Pat. Nos. 4,976,251; 4,940,038; 5,031,325; 3,656,468; and 4,924,843.

The instant invention attempts to overcome deficiencies of the prior art wherein an elongate saw structure having a readily graspable tubular handle includes a coolant line directed to the saw blade to permit cooling of the saw during a cutting procedure and maintaining dust generation to limited production and in this respect, the present invention substantially fulfills this need.

SUMMARY OF THE INVENTION

In view of the foregoing disadvantages inherent in the known types of saw apparatus now present in the prior art, the present invention provides a tile saw apparatus wherein the same is directed to the elongate saw structure having a cooling fluid conduit directed therethrough for directing cooling fluid onto an associated saw blade. As such, the general purpose of the present invention, which will be described subsequently in greater detail, is to provide a new and improved tile saw apparatus which has all the advantages of the prior art saw apparatus and none of the disadvantages.

To attain this, the present invention provides a tile saw arranged to include a drive motor and output shaft. The tile saw output shaft includes a fluid conduit in a further embodiment directing cooling fluid flow to the associated circular saw employing a drive fluid pump therefore. In a further embodiment, a modified circular sector hood is mounted about the saw directing fluid flow to the periphery of the circular saw in use.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved tile saw apparatus which has all the advantages of the prior art saw apparatus and none of the disadvantages.

It is another object of the present invention to provide a new and improved tile saw apparatus which may be easily and efficiently manufactured and marketed.

It is a further object of the present invention to provide a new and improved tile saw apparatus which is of a durable and reliable construction.

An even further object of the present invention is to provide a new and improved tile saw apparatus which is susceptible of a low cost of manufacture with regard to both materials and labor, and which accordingly is then susceptible of low prices of sale to the consuming public, thereby making such tile saw apparatus economically available to the buying public.

Still yet another object of the present invention is to provide a new and improved tile saw apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
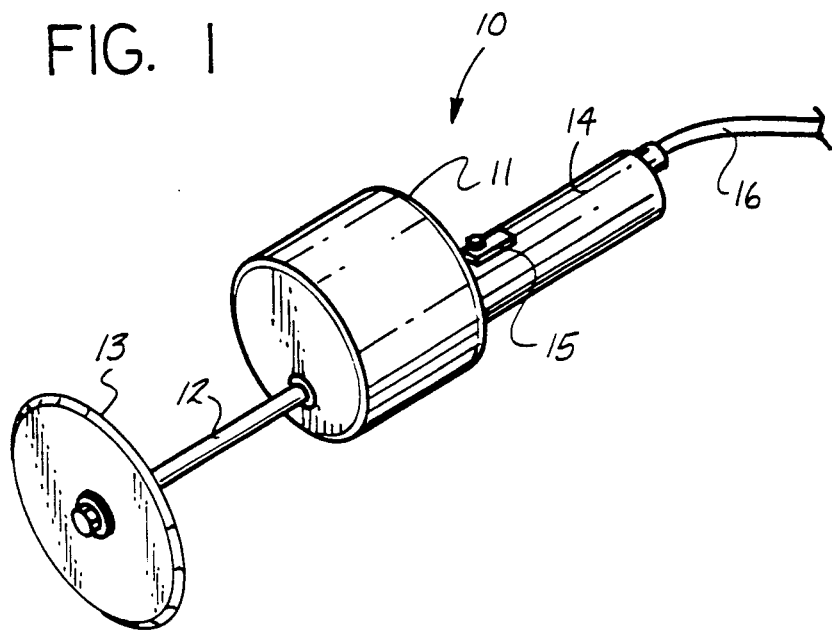
FIG. 1 is an isometric illustration of the invention in a basic construction.
Figure 2:
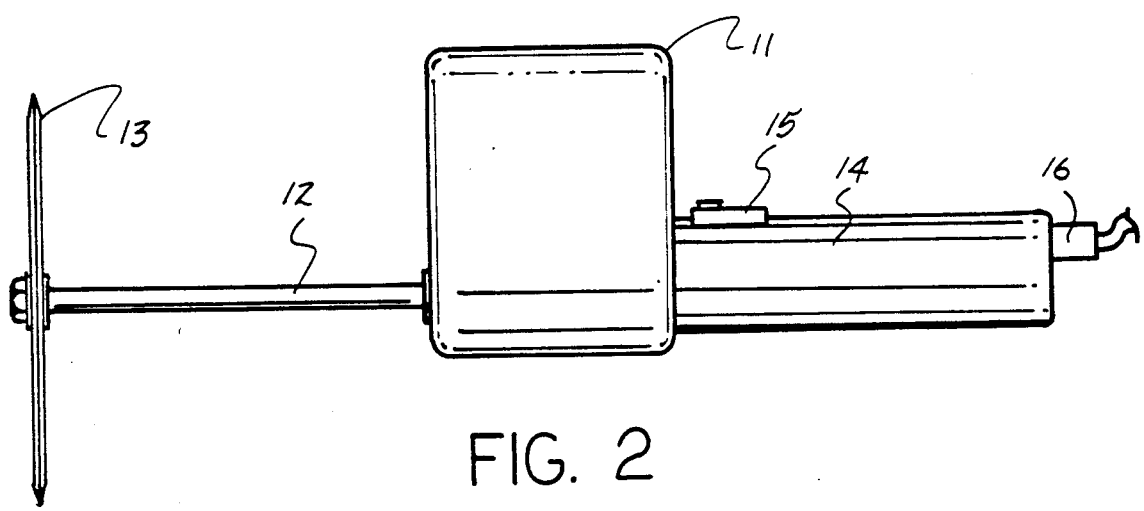
FIG. 2 is an orthographic side view of the invention.

With reference now to the drawings, and in particular to FIGS. 1 to 8 thereof, a new and improved tile saw apparatus embodying the principles and concepts of the present invention and generally designated by the reference numerals 10 and 10a will be described.

More specifically, the tile saw apparatus 10 of the instant invention essentially comprises a drive motor housing 11, having a housing front wall spaced from a housing rear wall, with an output shaft housing 12 orthogonally mounted to the housing front wall, having a drive shaft 12a rotatably directed therethrough from the drive motor within the housing 11. The drive motor 11 is of conventional electric gear reduction type operative through the electrical power supply cord 16 and the on/off switch 15 mounted within the handle 14 fixedly and orthogonally mounted relative to the housing rear wall. A rotary circular saw blade 13 is orthogonally mounted to a forward end of the drive shaft 12a beyond the shaft housing 12.

Figure 3:
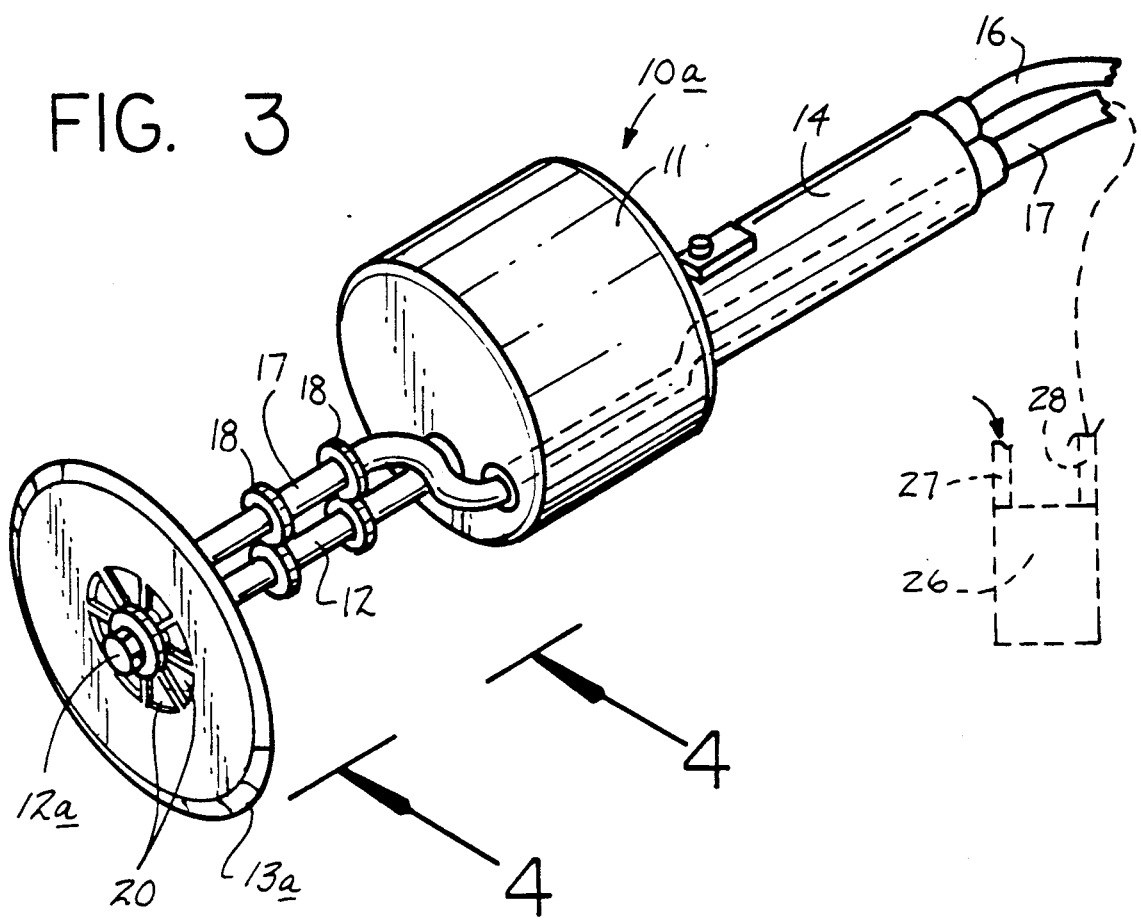
FIG. 3 is an isometric illustration of a modified aspect of the invention.
Figure 4:
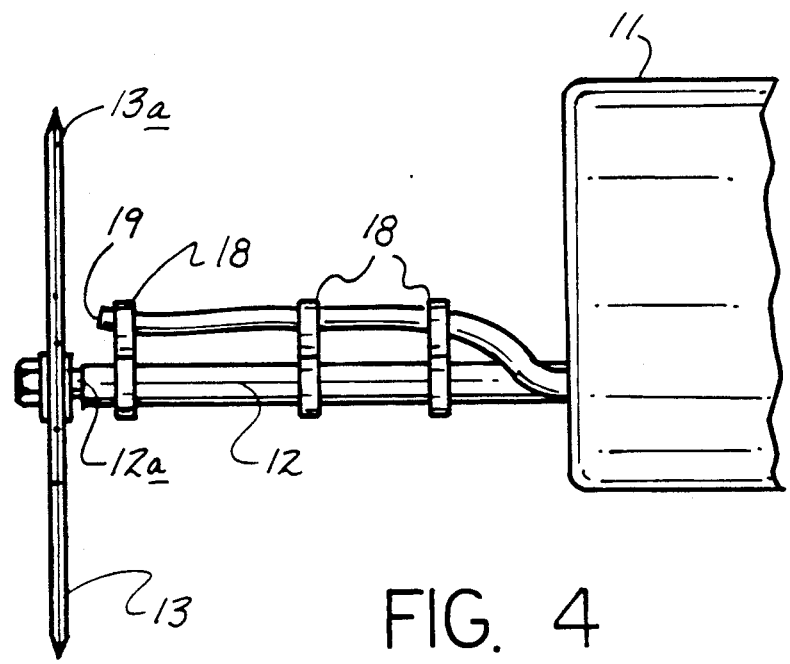
FIG. 4 is an orthographic view, taken along the lines 4—4 of FIG. 3 in the direction indicated by the arrows.

Reference to the FIGS. 3 and 4 for example include the apparatus 10a having a fluid delivery conduit 17 directed into the handle 14 from a fluid pump 26 having a fluid pump inlet 27 and a fluid pump outlet 28 directing pressurized fluid supply through the fluid delivery conduit 17. The fluid delivery conduit 17 further is directed through the housing 11 and is mounted in spaced adjacency to the output shaft housing 12 employing a plurality of conduit mounting plates 18 each secured to the shaft housing 12 and the delivery conduit 17. The delivery conduit includes a conduit exit port 19 positioned in adjacency relative to the modified circular saw blade 13a, that in turn includes a plurality of saw blade window openings 20 positioned in annular array in adjacency to the drive shaft 12a to permit fluid flow through the windows controlling dust generation, as well as providing cooling when the fluid from the conduit 17 is imparted to the blade structure 13a.

Figure 5:
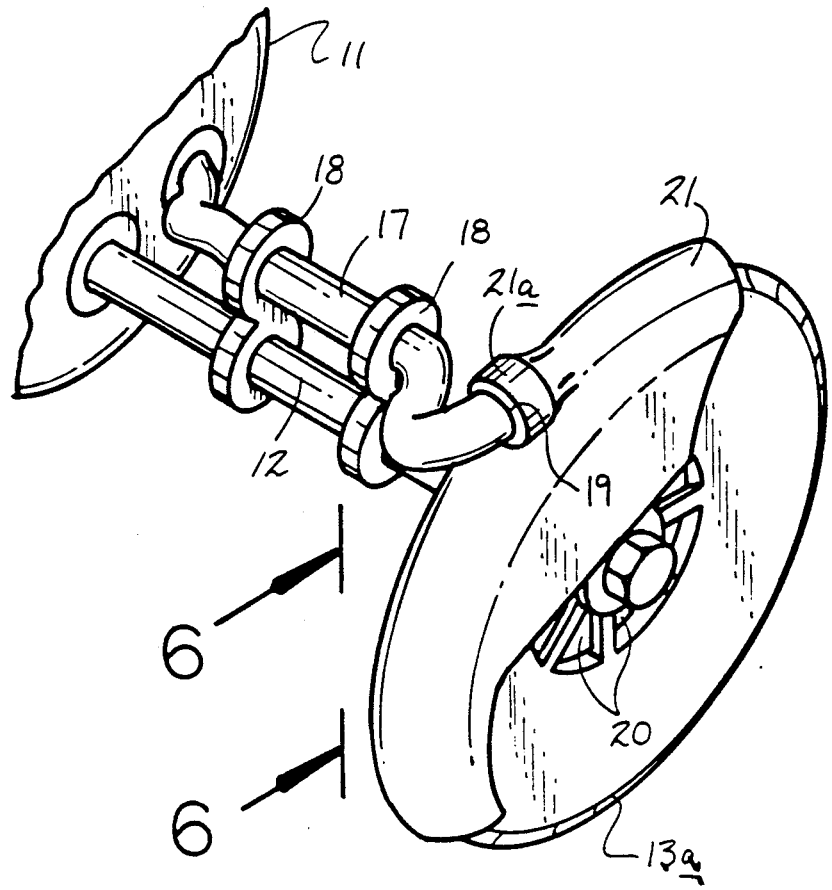
FIG. 5 is an isometric illustration of the saw structure employing a hood member for the associated saw blade.
Figure 6:
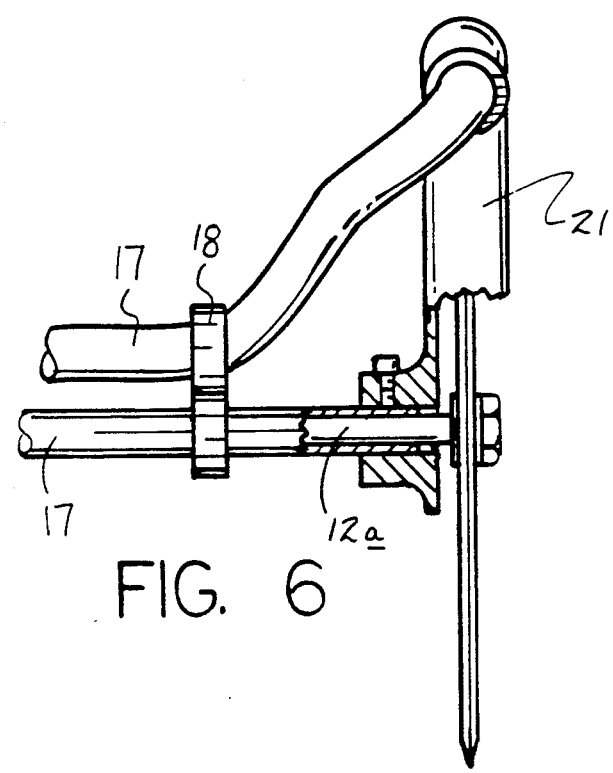
FIG. 6 is an orthographic view, taken along the lines 6—6 in FIG. 5 partially in section.

The FIGS. 5 and 6 include a saw blade hood 21 configured in a semi-annular sector receiving the saw blade 13a therewithin. The exit port 19 of the conduit 17 is received within a fluid receiving socket 21a of the hood 21. The exit port 19 is tangentially aligned relative to the saw blade 13a to enhance cooling and dust control. If desired, the conduit 17 and specifically the exit port 19 may be removed relative to the hood socket 21a and positioned in adjacency relative to the windows 20, in a manner as indicated in FIG. 4, with the conduit accordingly formed of a malleable and deformable material.

Figure 7:
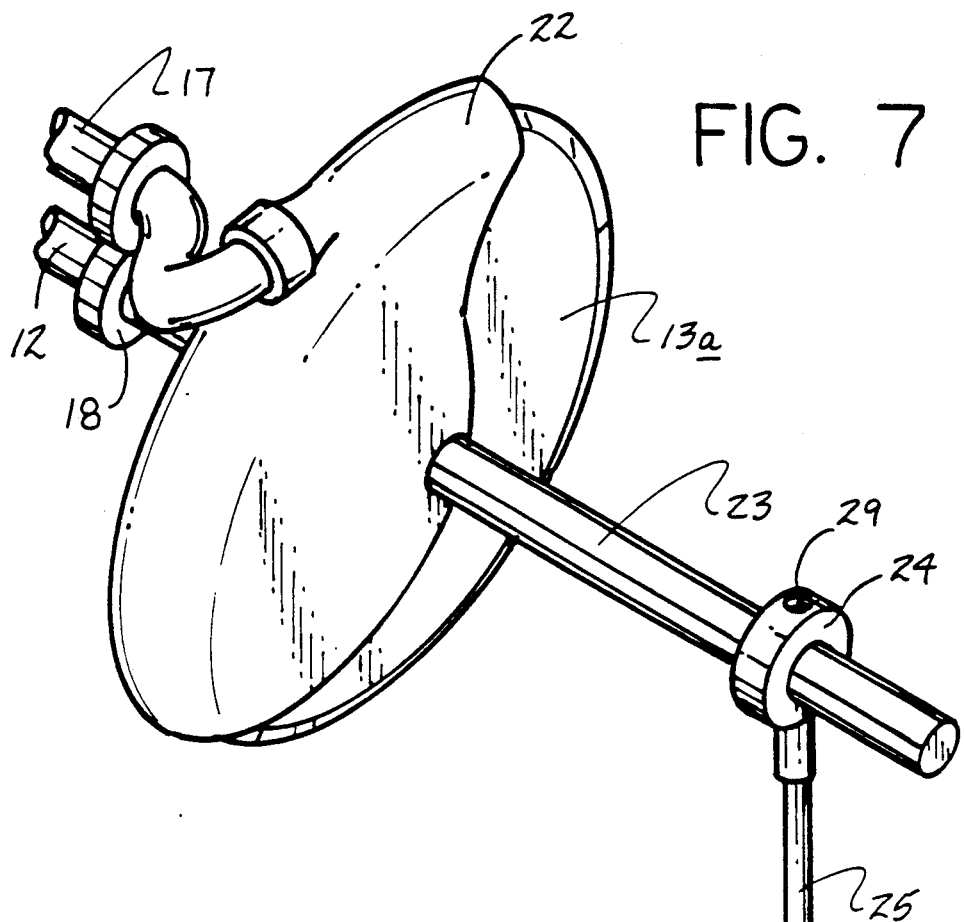
FIG. 7 is an isometric illustration of the hood structure including a radius support leg mounted thereto.
Figure 8:
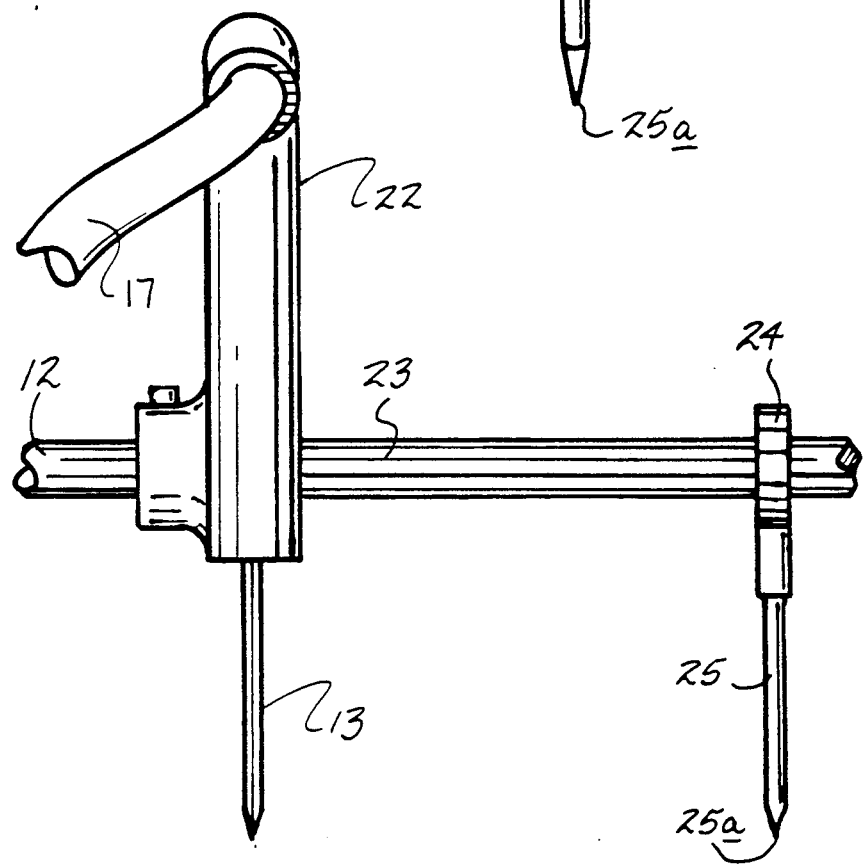
FIG. 8 is an orthographic side view of the radius support leg positioned in adjacency to the saw blade.

The FIGS. 7 and 8 further include the hood 22 formed with a mounting shaft 23 fixedly mounted to the hood and coaxially aligned relative to the drive shaft 12a, with a mounting collar 24 arranged for sliding reception on the mounting shaft 23 by use of a fastener 29 to engage the shaft 23 through the collar 24. A leg member 25 having a pointed support end 25a is provided for positioning upon a workpiece to permit pivoting about the pointed support end 25a in cutting a radius with the saw blade 13a. Accordingly, the saw blade 13a has a blade radius substantially equal to the length of the leg 25.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tile saw apparatus, comprising,
   a drive motor housing, having a housing front wall spaced from a housing rear wall in a parallel relationship, with an output shaft housing orthogonally mounted to the housing front wall, with a drive shaft rotatably directed through the output shaft housing, with a rotary circular saw blade orthogonally and fixedly mounted to a free distal end of the drive shaft, and
   a handle, the handle fixedly and orthogonally mounted to the housing rear wall, and
   an on/off switch mounted to the handle, and
   a fluid delivery conduit directed through the handle and through the drive motor housing, and the fluid delivery conduit directed through the housing front wall and extending coextensively with the output shaft housing, and a plurality of mounting plates fixedly mounted to the fluid delivery conduit and the output shaft housing along the output shaft housing, with the fluid delivery conduit having a conduit exit port directing fluid onto the saw blade, and
   the saw blade includes a plurality of saw blade window openings directed in an annular array about the output shaft housing, and the conduit exit port is arranged for selective orientation in adjacency to the window openings, and
   a hood member fixedly mounted to the output shaft housing receiving the saw blade therewithin, with the hood member including a hood socket arranged for reception of the conduit exit port to direct fluid tangentially along the saw blade, and
   a mounting collar fixedly and orthogonally mounted to the hood coaxially aligned relative to the drive shaft, with a mounting collar arranged for adjustable securement along the mounting shaft, with the mounting collar including a leg member fixedly and orthogonally oriented relative to the mounting shaft, with the leg member having a pointed support end arranged for anchoring the leg for a radial cut of the saw blade.

* * * * *